United States Patent [19]

Walker

[11] 4,266,420
[45] May 12, 1981

[54] CRIMPING TOOL

[75] Inventor: John A. Walker, Claremore, Okla.

[73] Assignee: Unit Rig & Equipment Co., Tulsa, Okla.

[21] Appl. No.: 88,415

[22] Filed: Oct. 26, 1979

[51] Int. Cl.³ .............................................. B21D 7/00
[52] U.S. Cl. ...................................... 72/416; 72/410; 269/277
[58] Field of Search ................ 72/416, 409, 410, 412, 72/454; 269/277, 271; 81/421–424, 425 R, 426, 420, 418, 5.1

[56] References Cited

U.S. PATENT DOCUMENTS

| 458,934 | 9/1891 | Barden | 81/425 R |
|---|---|---|---|
| 1,136,853 | 4/1915 | Walters | 269/277 |
| 2,387,991 | 10/1945 | Haas | 269/277 |

FOREIGN PATENT DOCUMENTS 16867 3/1956 Fed. Rep. of Germany ............. 72/416

*Primary Examiner*—Nicholas P. Godici
*Assistant Examiner*—Gene P. Crosby

*Attorney, Agent, or Firm*—William S. Dorman

[57] ABSTRACT

A crimping tool comprising a top plate, a parallel bottom plate, a rigid arm disposed between the plates and being affixed thereto, a movable arm positioned adjacent the rigid arm and having one end thereof pivotally mounted to the plates adjacent one end of the rigid arm, the rigid arm and the movable arm being positioned and formed so that their free ends comprise opposed crimping jaws for allowing the positioning of a portion of a circle clamp therebetween when the arms are in an open position, the top plate having a sufficient width so as to rest atop the open jaws of a bench vise when the crimping jaws are fully opened, the bottom plate having a width no greater than the combined widths of the arms in order to allow the jaws of the bench vise to close against the arms, a spring for holding the crimping jaws open for facilitating the positioning of a portion of a circle clamp therebetween, and an alignment bolt for holding the crimping tool within the jaws of the bench vise whereby the crimping jaws extend beyond the jaws of the bench vise.

4 Claims, 6 Drawing Figures

CRIMPING TOOL

BACKGROUND OF THE INVENTION

1. Field of the Invention

This invention relates to a crimping tool for the crimping of circle clamps onto a plurality of cables, more particularly electric cables. Primarily, the invention is used in conjunction with a bench vise or with wrenches or pliers whenever a bench vise is not available.

2. Description of the Prior Art

Tools which cinch or crimp ferrules or terminals onto electric cables are well known. These prior art devices are generally plier-like in their construction, are operated manually and are therefore limited to manual forces, unlike the present invention which utilizes a multiplied force by the use of a bench vise or the like.

SUMMARY OF THE INVENTION

A principal object of the present invention is to provide a crimping tool or device for attaching a circle clamp onto a plurality of electric cables with greater facility and workmanship quality. Primarily the circle clamp is attached as a harness rather than a connecting bond; therefore, this device can be used with a single cable.

The crimping tool comprises a top plate, a spaced parallel bottom plate, and a rigid arm disposed between the plates and affixed to the plates by welds. A movable arm received between the plates is pivotally mounted to them and has its pivot end adjacent one end of the rigid arm. The positions of the two arms are such that their free ends form opposed crimping jaws. A compression spring is mounted into holes drilled on the inside surfaces of the arms. This spring provides a resilient means whereby the crimping jaws are held open. A threaded bolt is received in a threaded hole on the rigid arm and through a suitable hole on the movable arm wherein the hole is adjacent the crimping jaws. This bolt acts as a stop or alignment means so that when the crimping tool is positioned in the jaws of a bench vise, the crimping jaws extend beyond the jaws of the bench vise. For field use or when a bench vise is not available, pliers or the like can be attached to the alignment bolt. The bolt can then be tightened in order to bring the crimping jaws together.

DETAILED DESCRIPTION OF THE PREFERRED EMBODIMENTS

Figure 1:
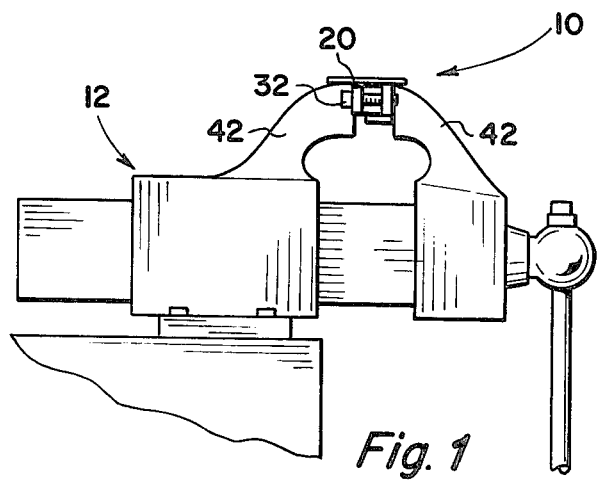
FIG. 1 is an elevational view showing the present invention in operational position within a bench vise.
Figure 2:
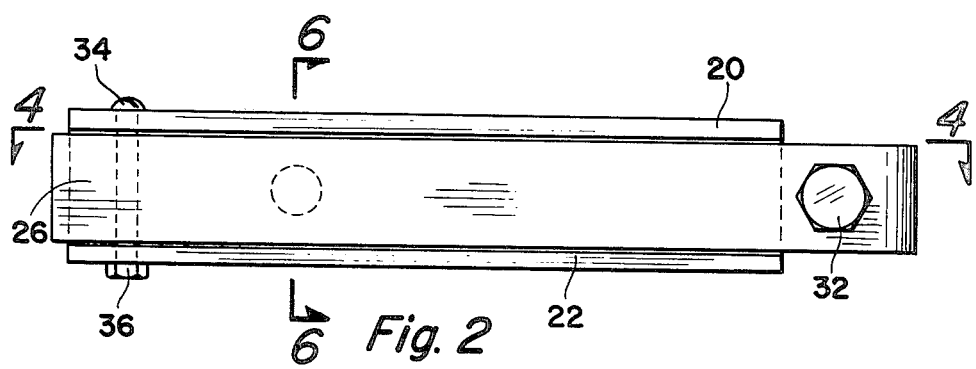
FIG. 2 is a side view showing hidden parts in broken lines.
Figure 3:
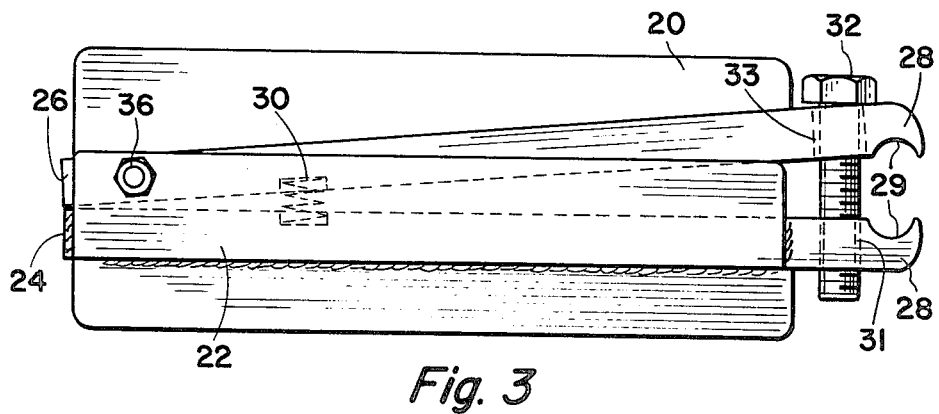
FIG. 3 is a bottom view showing hidden parts in broken lines.

Referring to the drawings in detail, FIG. 1 shows a crimping tool 10 positioned in a bench vise 12. As shown in FIGS. 2 and 3, crimping tool 10 is comprised of a top plate 20, a bottom plate 22, a rigid arm 24 and a movable arm 26. Rigid arm 24 is parallel to and between plates 20 and 22 and is affixed to the plates by welds. Movable arm 26 is received between top plate 20 and bottom plate 22 and is mounted pivotally to the plates by means of a perpendicular bolt 34 and a nut 36. The pivotal end of movable arm 26 is in an adjacent position to one end of the rigid arm, so that the free ends of the arms provide opposed crimping jaws 28. Crimping jaws 28 are formed by two semi-circular depressions 29 placed along the inner surfaces of arms 24 and 26. Depressions 29 allow for ease of positioning and crimping a circle clamp.

Rigid arm 26 is preferably equal in size to movable arm 26. Plates 20 and 22 may be of equal length as shown; however, bottom plate 22 is narrower than top plate 20. The width of bottom plate 22 should be equal to or less than the combined widths of the arms 24 and 26, so as not to interfere with jaws of the bench vise during the crimping operation. The width of top plate 20 should be sufficiently wide so as to rest atop the jaws of bench vise 12, as shown in FIG. 1, when crimping tool 10 is in its fully open position.

Figure 4:
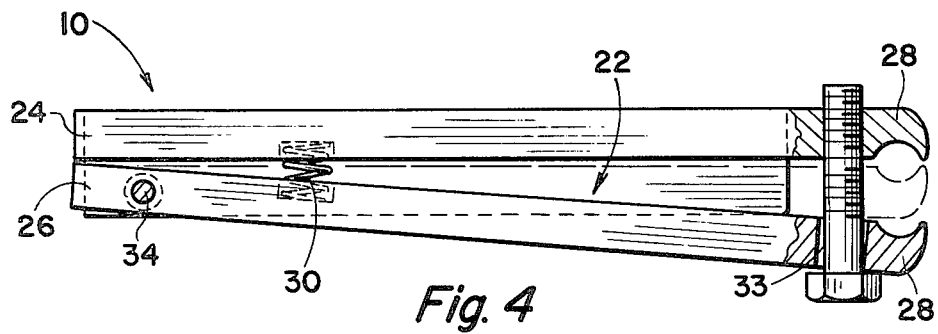
FIG. 4 is a cross-sectional view taken along line 4—4 of FIG. 2 with certain parts being broken away to show details.
Figure 5:
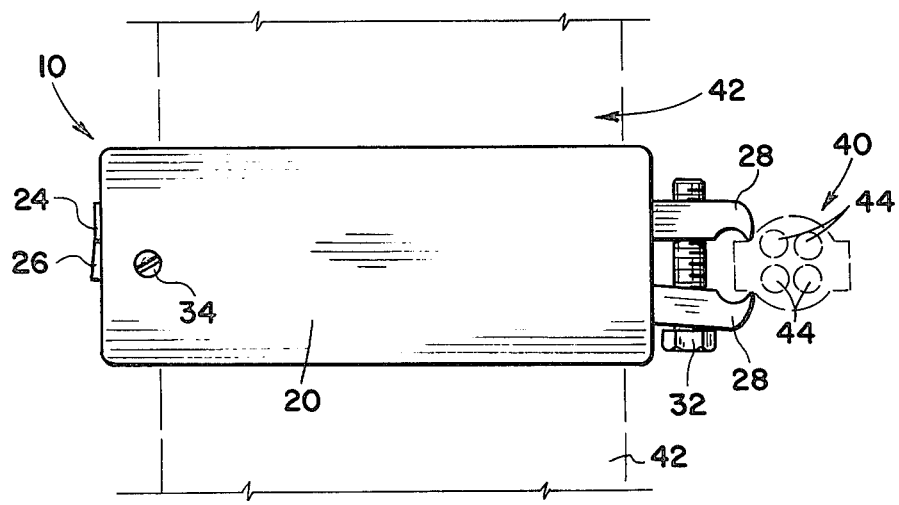
FIG. 5 is a top plan view showing bench vise jaws and a circle clamp in broken lines.
Figure 6:
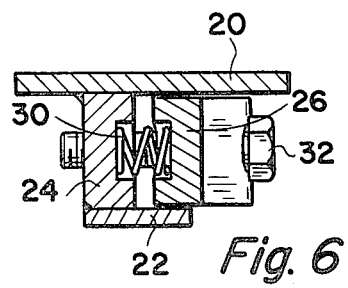
FIG. 6 is a cross-sectional view taken along line 6—6 of FIG. 2.

Resilient means, such as a compression spring 30, is mounted into holes drilled on the inside surfaces of rigid arm 24 and movable arm 26, as shown in FIG. 6. Spring 30 is used to hold crimping jaws 28 open for the positioning of a circle clamp therein prior to operation. A threaded alignment bolt 32 is received in a threaded hold 31 in rigid arm 24 and passes through a hole 33 in movable arm 26. In relation to the hole 33, the shaft of bolt 32 is smaller and its head is larger. Alignment bolt 32 is used as a stop for placement of crimping tool 10 in bench vise 12, so that crimping jaws 28 extend beyond the jaws of bench vise 12. Alignment bolt 32 can also be used in conjunction with pliers or a wrench for field use of crimping tool 10 where no bench vise is readily available. The crimping operation, as shown in FIGS. 4 and 5, is accomplished by pivoting movable arm 26 toward rigid arm 24, thereby compressing spring 30 and bringing crimping jaws 28 together. FIG. 5 shows the positioning of a circle clamp 40 within crimping jaws 28 and the positioning of crimping tool 10 in the vise jaws 42 prior to the attachment of circle clamp 40 to a plurality of electric cables 44.

Whereas, the present invention has been described in particular relation to the drawings attached hereto, it should be understood that other and further modifications of the invention, apart from those shown or suggested herein, may be made within the scope and spirit of the invention.

What is claimed is:

1. A crimping tool comprising a top plate, a bottom plate, said plates being parallel, a rigid arm disposed between said plates and being affixed thereto, a movable arm positioned adjacent said rigid arm and having one end thereof pivotally mounted to said plates adjacent one end of said rigid arm, said rigid arm and said movable arm being positioned so that the free ends of said arms opposite said one end comprise opposed crimping jaws, said crimping jaws allowing for positioning of a portion of a circle clamp therebetween when said arms are in an open position, said top plate having a sufficient width to allow said top plate to rest atop the open jaws of a bench vise while said crimping jaws are fully opened, said bottom plate having a width no greater than the combined widths of said arms in order to allow the jaws of said bench vise to close against said arms, resilient means for holding said crimping jaws open for facilitating the positioning of a portion of said circle clamp therebetween, and means for alignment of said crimping tool within said jaws of said bench vise whereby said crimping jaws extend beyond said jaws of said bench vise.

2. A crimping tool as set forth in claim 1, wherein said alignment means comprises a threaded bolt received in a threaded hole in one said arm and extending outwardly through a suitable hole in the other said arm and adjacent said crimping jaws, whereby said bolt can be tightened to move said crimping jaws toward each other in the absence of a bench vise.

3. A crimping tool as set forth in claim 1, wherein said resilient means comprises a compression spring within opposed holes in the two arms between the ends thereof.

4. A crimping tool as set forth in claim 1, wherein said opposed crimping jaws comprise two opposed semi-circular depressions along the free ends of said arms.

* * * * *